United States Patent
Dudik et al.

(10) Patent No.: US 11,798,029 B2
(45) Date of Patent: Oct. 24, 2023

(54) SYSTEM FOR EFFECTIVE USE OF DATA FOR PERSONALIZATION

(71) Applicant: Microsoft Technology Licensing, LLC, Redmond, WA (US)

(72) Inventors: Miroslav Dudik, Montclair, NJ (US); Akshay Krishnamurthy, Brooklyn, NY (US); Maria Dimakopoulou, Sunnyvale, CA (US); Yi Su, Ithaca, NY (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 799 days.

(21) Appl. No.: 16/657,533

(22) Filed: Oct. 18, 2019

(65) Prior Publication Data
US 2020/0394473 A1 Dec. 17, 2020

Related U.S. Application Data

(60) Provisional application No. 62/861,843, filed on Jun. 14, 2019.

(51) Int. Cl.
*G06Q 30/02* (2023.01)
*G06Q 30/0251* (2023.01)
(Continued)

(52) U.S. Cl.
CPC ......... *G06Q 30/0254* (2013.01); *G06F 17/18* (2013.01); *G06F 18/2148* (2023.01);
(Continued)

(58) Field of Classification Search
CPC .... G06K 9/6265; G06K 9/6267; G06F 17/18; G06N 3/088; G06Q 30/0243; G06Q 30/0254
See application file for complete search history.

(56) References Cited

U.S. PATENT DOCUMENTS 7,630,935 B2 * 12/2009 Loeger .................. G06Q 30/02
705/35
2009/0254413 A1 * 10/2009 Chang ................ G06Q 30/0215
705/14.3
(Continued)

FOREIGN PATENT DOCUMENTS

WO    WO-2018215665 A1 *  11/2018  ............. G06N 3/006

OTHER PUBLICATIONS

"Custom Decision Service", Retrieved From: https://web.archive.org/web/20180624201029/https://labs.cognitive.microsoft.com/en-us/project-custom-decision. Published on: Jun. 24, 2018, 3 Pages.
(Continued)

*Primary Examiner* — Scott C Anderson

(57) ABSTRACT

Off-policy evaluation of a new "target" policy is performed using historical data gathered based on a previous "logging" policy to estimate the performance of the target policy. An estimator may be used, wherein either a quality-based estimator or a quality-agnostic estimator is used to weight the difference between an observed reward in the historical data and an estimated reward generated by the target policy. A quality-agnostic estimator may be used to evaluate an importance weight according to a threshold. In such examples, when the importance weight exceeds the threshold, the quality-agnostic estimator clips the importance weight at the threshold, thereby providing an fixed upper bound irrespective of the quality of the reward predictor. In other examples, a quality-based estimator is used, in which an upper bound incorporates the quality of the reward predictor in order to modify an importance weight used by the estimator.

14 Claims, 9 Drawing Sheets

(51) Int. Cl.
*G06N 3/088* (2023.01)
*G06F 17/18* (2006.01)
*G06Q 30/0242* (2023.01)
*G06F 18/21* (2023.01)
*G06F 18/214* (2023.01)

(52) U.S. Cl.
CPC ......... *G06F 18/2193* (2023.01); *G06N 3/088* (2013.01); *G06Q 30/0243* (2013.01)

(56) References Cited

U.S. PATENT DOCUMENTS

| | | | |
|---|---|---|---|
| 2012/0016642 A1 | 1/2012 | Li et al. | |
| 2013/0223612 A1* | 8/2013 | Flockhart | H04M 3/5175 379/265.02 |
| 2016/0005056 A1* | 1/2016 | Gunjan | G06Q 30/0202 705/7.31 |
| 2016/0105351 A1 | 4/2016 | Slivkins et al. | |
| 2017/0154415 A1* | 6/2017 | Aydin | H04N 17/004 |
| 2017/0364371 A1* | 12/2017 | Nandi | G06F 16/287 |
| 2019/0073363 A1 | 3/2019 | Perez et al. | |
| 2019/0303995 A1* | 10/2019 | Li | G06Q 30/0633 |
| 2019/0318648 A1* | 10/2019 | Zhang | G09B 7/04 |

OTHER PUBLICATIONS

"International Search Report and Written Opinion Issued in PCT Application No. PCT/US20/030002", dated Jul. 15, 2020, 15 Pages.

\* cited by examiner

SYSTEM FOR EFFECTIVE USE OF DATA FOR PERSONALIZATION

CROSS-REFERENCE TO RELATED APPLICATION

This application claims priority to U.S. Provisional Application No. 62/861,843, titled "A System for Effective Use of Data for Personalization," filed on Jun. 14, 2019, the entire disclosure of which is hereby incorporated by reference in its entirety.

BACKGROUND

In applications using the contextual bandit protocol, a logging policy is used to take action based on a given context, thereby earning a reward. In some instances, a logging policy is evaluated based on an average reward metric. However, generating an updated or new policy (a "target policy") that achieves a similar or improved average reward metric is difficult without costly AB testing and large datasets.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

This disclosure describes systems and methods for evaluating a policy and generating a policy with improved performance. In some examples, off-policy evaluation is performed using historical data gathered based on a previous algorithm (e.g., a "logging policy") in order to estimate the performance of an updated algorithm (e.g., a "target policy"). An estimator may be used, wherein an importance weight is used to weight the difference between an observed reward in the historical data and an estimated reward generated by the target policy (e.g., as may be estimated by a reward predictor). In examples, the approach involves reducing an importance weight to improve a bound on the mean squared error (MSE). In some examples, a quality-agnostic estimator is used to evaluate an importance weight according to a threshold. In such examples, when the importance weight exceeds the threshold, the threshold is used as the importance weight, thereby providing an upper bound that is irrespective of the quality of the reward predictor. In other examples, a quality-based estimator is used, in which an upper bound incorporates the quality of the reward predictor in order to modify an importance weight used by the estimator.

It will be appreciated that, in another example, the off-policy estimates can be used to generate a new target policy. In examples, an estimator that improves a bound on the MSE may be selected and used to generate the target policy accordingly. Aspects described herein for evaluating policies and for generating an optimized policy are adaptive to different applications and contexts. Such an approach may result in evaluation and optimization that is more accurate given the same amount of historical data from a previous logging policy. Therefore, less data may be necessary to perform adequate evaluation and optimization of policies, thereby reducing difficulties associated with collecting data and potential issues arising from outdated or stale data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
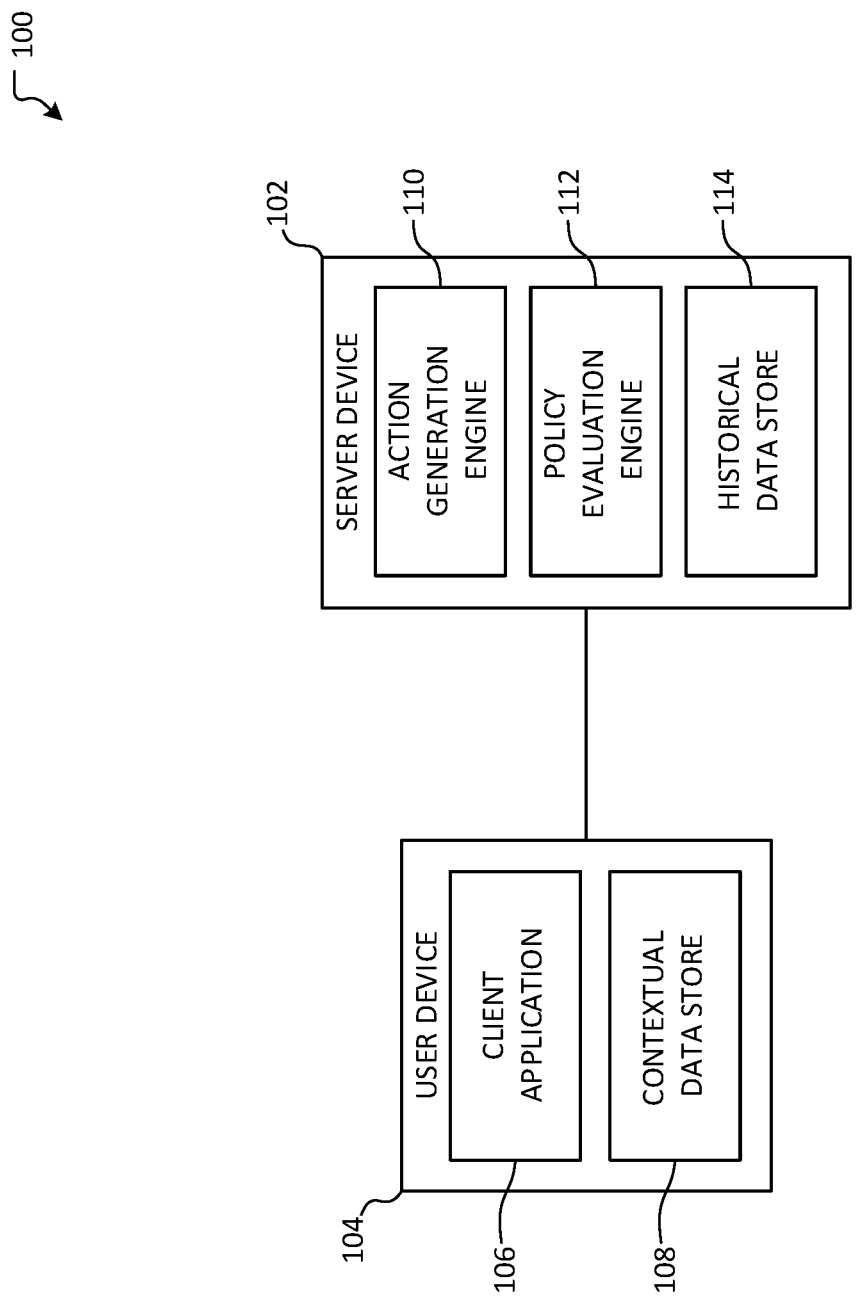
FIG. 1 illustrates an overview of an example system for improved personalization techniques according to aspects described herein.

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. The following detailed description is, therefore, not to be taken in a limiting sense.

In examples of a contextual bandit protocol, a policy evaluates a context, determines an action based at least in part on the context, and accrues reward. As used herein, a policy (or "decision maker") may be a pre-existing "logging" policy or a new "target" policy. In examples, a policy is generated with the goal of increasing or maximizing the probability of accruing a reward for a given context (e.g., based on the determined action). As an example, determining an action may comprise selecting a content item from a set of content items for presentation to a user. Accordingly, if the user engages with the content item, a reward is earned. However, if the user does not engage with the content item, no reward is earned. Thus, a reward may be represented as '1' if the user engages with the content item or '0' if the user does not. Thus, in such an example, a policy that increases or maximizes the likelihood of accruing a reward entails presenting content that is likely to result in user engagement.

In examples, a context space from which a context is observed may be uncountably large. In other examples, it may be assumed that an action space from which an action is determined is finite. As used herein, context may relate to user activity on a user device, such as clicking on links, opening emails, sending emails, opening applications, interactions within applications, a location or time at which an application is used, and other user activity performed on the user device. Accordingly, example actions include, but are not limited to, presenting a content item (e.g., a link to a website, textual content, graphical content, video content, audio content, target content, etc.), an application or an action within an application on the user device, or a contact, among other actions (e.g., ranking a set of content items). If user interaction results from the determined action (e.g., a user clicks on a link, calls a contact, etc.), a reward is incurred. As another example, an initial reward may be incurred if the user interacts with the presented content, and a subsequent reward may be incurred if the user initiates and/or completes a purchase associated with the presented content. It will be appreciated that while examples are generally described herein with a singular action, similar techniques may be used to determine a set of actions (e.g., presenting multiple content items, multiple applications or actions within an application, multiple contacts, etc.). In such examples, an associated reward is incurred if any one action of the set of actions results in a user interaction.

A target policy may be evaluated using off-policy evaluation. In examples, the goal of off-policy evaluation is to use historical data gathered by a past policy (e.g., a logging policy) in order to estimate the performance of the new target policy. As an example, historical data may include, but is not limited to, a set of triples, wherein each triple comprises a context, an associated action, and a resulting reward. It will be appreciated that historical information may include additional, less, or alternative information relating to a user interaction associated with the logging policy. Returning to the above example, off-policy evaluation of a target policy may be performed based on historical data relating to user interactions with content identified according to a logging policy. Thus, off-policy evaluation of the target policy comprises determining a predicted likelihood that the target policy will identify content with which a user will engage, based on historical interactions resulting from the logging policy. Accordingly, if the target policy appears to have a higher likelihood of user engagement (and therefore a higher predicted reward) than the logging policy, the target policy may be implemented in place of the logging policy.

High quality off-policy estimates may avoid costly AB testing and may also be used to generate an improved or optimized policy. As used herein, an "optimized" policy refers to a policy that exhibits one or more improved characteristics as compared to a previous policy. For example, a target policy may exhibit a reduced mean squared error or an increased average reward as compared to a logging policy, among other examples. It will be appreciated that while examples herein are described with respect to a user interacting with selected content, any of a variety of contexts, actions, and rewards may be used according to the present disclosure.

A challenge in off-policy evaluation is distribution mismatch, where actions determined by a target policy for a given context may differ from historical actions determined by the logging policy that was in-use when the historical data was collected. "Doubly robust estimation" is an example estimator that may be used to address such challenges. In examples, doubly robust estimation uses a combination of inverse propensity scoring and direct modeling, where inverse propensity scoring may be used to correct a distribution mismatch by reweighting the data, while direct modeling may be used to reduce the impact of large importance weights. As an example, direct modeling comprises generating and using a regression model to predict rewards. In other examples, a reward predictor may be trained and used to generate a predicted reward for a given context.

Doubly robust estimation may yield results that are less biased or unbiased, and that have a smaller variance than those achieved using inverse propensity scoring. Further, doubly robust estimation may be asymptotically optimal under weaker assumptions than direct modeling. However, since doubly robust estimation may use the same importance weights as inverse propensity scoring, its variance can still be high, unless the reward predictor is highly accurate. Accordingly, in some examples, doubly robust estimation may be further improved according to aspects described herein by clipping or removing large importance weights, such as by using either a quality-agnostic estimator or a quality-based estimator to weight reward predictions used by a doubly robust estimation model. While weight clipping or shrinking may incur a small bias, it may also substantially decrease the variance, which can result in a lower mean squared error (MSE) than implementing doubly robust estimation without such techniques. This disclosure presents systems and methods that improve off-policy evaluation through weight clipping.

Aspects described herein allow for better evaluation and optimization of policies. For example, less historical data associated with a logging policy may be required to evaluate a target policy, thereby reducing computational overhead associated with acquiring and processing the historical data. Additionally, as a result of efficiently using less historical data for off-policy evaluation, the complexities of obtaining relevant and current historical data are reduced, thereby minimizing the impact of potentially stale data on the evaluation. Further, as noted above, costly AB testing can be avoided, among other benefits.

Off-policy evaluation techniques described herein may also be performed using an associated hyperparameter. In examples, the approach presented herein involves shrinking the importance weights to optimize a bound on the MSE of the estimator. Two classes of estimators are described herein. The first estimator class is not tied to the quality of the reward predictor and is referred to herein as a "quality-agnostic" estimator or doubly robust estimation with "pessimistic shrinkage." The quality-agnostic estimator uses a threshold to evaluate an importance weight. In examples, when the importance weight exceeds the threshold, the threshold is used in place of the importance weight, thereby clipping importance weights that are above the threshold. However, if the importance weight does not exceed the threshold, the importance weight is not changed. As an example, a quality-agnostic estimator $\hat{w}_{p,\lambda}(x,a)$ may be modeled by the equation below:

$$\hat{w}_{p,\lambda}(x,a) = \min\{\lambda, w(x,a)\}$$

In the above equation, p indicates that the estimator is quality-agnostic (e.g., it does not account for the quality of the reward predictor), $\lambda$ represents a value of the hyperparameter (e.g., the threshold at which weights are clipped), x represents a context for a contextual bandit policy, a represents the action associated with the context x (e.g., as may have been generated by a logging policy), w(x,a) represents the importance weight, and $\hat{w}_{p,\lambda}(x,a)$ represents the new importance weight according to the quality-agnostic estimator. It will be appreciated that the above equation is provided as an example equation with which to implement doubly robust estimation with pessimistic shrinkage.

In other aspects, a second class of estimator is used, which is referred to herein as a quality-based estimator or doubly robust estimation with "optimistic shrinkage." Unlike the quality-agnostic estimator, the quality-based estimator uses an upper bound that is based on the quality of the reward predictor. For example, an importance weight generated according to a quality-based estimator may be modified or generated in a way that incorporates the original importance weight. In some examples, the approach herein may bound the bias and variance in terms of the weighted square loss. As an example, a quality-based estimator $\hat{w}_{o,\lambda}(x,a)$ may be modeled by the equation below:

$$\hat{w}_{o,\lambda}(x, a) = \frac{\lambda}{w^2(x, a) + \lambda} w(x, a)$$

In the above equation, o indicates that the estimator is quality-based (e.g., it relies on the quality of the reward predictor), $\lambda$ represents a value of the hyperparameter, x represents a context for a contextual bandit policy, a represents the action associated with the context x (e.g., as may have been generated by a logging policy), w(x,a) represents the importance weight, and $\hat{w}_{o,\lambda}(x,a)$ represents the new importance weight according to the quality-based estimator. It will be appreciated that the above equation is provided as an example equation with which to implement doubly robust estimation with optimistic shrinkage.

As discussed above, each class of estimator may include a hyperparameter in order to reduce or, in some examples, eliminate bias and variance from the estimator. In some examples, a model selection procedure is used to tune the hyperparameter (e.g., $\lambda$ in the above example equations) and/or determine which estimator class to use (e.g., a quality-agnostic estimator, a quality-based estimator, etc.). As an example, the model selection process comprises selecting a value for the hyperparameter and determining which estimator to use, such that the resulting off-policy evaluation model yields an MSE below a target threshold or, in some examples, within a predetermined range. Accordingly, the techniques described herein achieve a similar or improved result as compared to previous solutions. Additionally, such off-policy evaluation techniques may exhibit improved finite-sample performance and may therefore achieve results that are comparable to other techniques using comparatively less historical data.

Similar techniques may be used in instances in which a policy is used to determine a list of actions rather than a single action. As an example, the overall reward for the list (which may vary according to the actions selected and their positions) may be estimated by decomposing it into individual contributions of each action. The contributions of all possible actions may be estimated by applying a weight matrix to the vector representation of the list of actions selected by the logging policy. The resulting contribution estimates can then be combined to evaluate the reward for the list of actions chosen by the target policy. An example equation $\hat{r}(x,S)$ for use in such scenarios is provided below:

$$\hat{r}(x,S) = \tilde{r}(x,S) + \Sigma_{j=1}^{\ell} \hat{\phi}_x[j\ s_j]$$

In the above equation, x is a context, S is a list of actions $(s_1, \ldots, s_\ell)$, $\tilde{r}(x,S)$ represents a reward predictor, $\hat{\phi}_x[j\ s_j]$ represents the contribution of action $s_j$ in slot j from the list of actions S, such that the summation of $\hat{\phi}_x$ yields the overall contribution according to each action in the list relative to what is already captured by $\tilde{r}$. It will be appreciated that the above equation is provided as an example and that, in other examples, different techniques may be used to apply aspects described herein to evaluate a list of actions.

In addition to evaluating a target policy, aspects described herein may be used to generate an improved or optimized policy. In examples, the improved policy is generated based on an analysis of historical data gathered according to a logging policy. As an example, an adaptive decision algorithm is used to determine actions for given contexts. The adaptive decision algorithm is tuned according to context and associated actions from the historical data. In other examples, the decision algorithm may make decisions that are randomized, at least in part, when determining an action, thereby increasing the likelihood of exploring different possible actions. In another example, an exploration budget is used, wherein the performance of the adaptive decision algorithm is evaluated (e.g., according to the one or more estimator classes and associated techniques described herein) as compared to a default policy (e.g., a logging policy, according to a fixed decision algorithm based on the historical data, etc.). In some examples, if the performance of the adaptive decision algorithm exceeds the exploration budget, the default policy may be used to determine actions instead until the performance is back within the exploration budget, thereby limiting the potential impact of performance degradation.

FIG. 1 illustrates an overview of an example system 100 for improved personalization techniques according to aspects described herein. As illustrated, system 100 comprises server device 102 and user device 104. In examples, server device 102 and user device 104 communicate using a network, such as a local area network, a wireless network, or the Internet, or any combination thereof. In an example, user device 104 is any of a variety of computing devices, including, but not limited to, a mobile computing device, a laptop computing device, a tablet computing device, or a desktop computing device. In other examples, server device 102 is a computing device, including, but not limited to, a desktop computing device or a distributed computing device. It will be appreciated that while system 100 is illustrated as comprising one server device 102 and one user device 104, any number of devices may be used in other examples.

User device 104 is illustrated as comprising client application 106 and contextual data store 108. Client application 106 may be a web browser or a messaging application, among other example applications. In examples, client application 106 communicates with server 102 to access content to display to a user of user device 104. As the user engages with client application 106, user interactions may be stored in contextual data store 108. Thus, contextual data store 108 may store any of a variety of context information, including, but not limited to, accessed links, opened emails, sent emails, opened applications, interactions within applications, a location or time at which an application is used, and other activities on user device 104.

Server device 102 is illustrated as comprising action generation engine 110, policy evaluation engine 112, and historical data store 114. In examples, action generation engine 110 uses a policy (e.g., a logging policy) to generate an action according to a given context. For example, user device 104 may provide context information from contextual data store 108, which is used by action generation engine 110 to determine an action. An indication of the action may be provided to user device 104. User device 104 may then generate a display according to the action (e.g., presenting a content item to a user, displaying a ranked list of content items, suggesting a content or application, etc.). Accordingly, depending on the outcome of the selected action, action generation engine 110 may receive an indication of an associated reward. In another example, action generation engine 110 may use a context determined at server device 102 (e.g., associated with a user account, with a specific cookie, with a session, etc.) instead of or in addition to context received from user device 104. In examples, action generation engine 110 logs historical data and stores such information in historical data store 114. As described above, historical data may be stored in the form of triples, comprising a context, a determined action, and an associated reward. It will be appreciated that, in other examples, additional, less, or alternative information may be stored as historical data in historical data store 114.

Server device 104 further comprises policy evaluation engine 112. Policy evaluation engine 112 implements aspects described herein to perform off-policy evaluation of a new policy (e.g., a target policy) according to historical data generated by an existing logging policy. In examples, policy evaluation engine 112 accesses historical data from historical data store 114 (e.g., as may have been generated by action generation engine 110). In examples, policy evaluation engine 112 performs a model selection process to determine whether to apply an off-policy evaluation model with a quality-agnostic estimator or a quality-based estimator in its analysis of the target policy in view of the historical data. Additionally, policy evaluation engine 112 may determine the value of an optional hyperparameter in order to further tune the model that is used to evaluate the target policy. Ultimately, the target policy is evaluated according to the determined off-policy evaluation model in order to compare the performance of the target policy to the logging policy that is currently in use by action generation engine 110. In examples, the comparison comprises evaluating an average reward metric, wherein the average reward incurred by each policy (e.g., for a set of contexts) is compared to determine which policy incurs the highest average reward. If the target policy exhibits a higher average reward metric, the target policy may be used by action generation engine 110 in place of the logging policy when generating subsequent actions according to given contexts. It will be appreciated that any of a variety of other metrics may be used to compare a target policy and a logging policy, including, but not limited to, average variance or a total reward value. Additional example aspects of policy evaluation engine 112 are discussed in greater detail below with respect to FIGS. 2A-2C.

While example implementations are described above with respect to a server computing device and/or a user device, it will be appreciated that any of a variety of other devices may be used to implement the aspects described herein. Similarly, while certain operations are described with respect to either server device 102 or user device 104, it will be appreciated that aspects described herein may be split among and performed by any of a wide array of computing device configurations. For example, aspects of action generation engine 110 may be performed by user device 102 or, in another example, at least a subpart of contextual data store 108 may reside on server device 102.

Figure 2A:
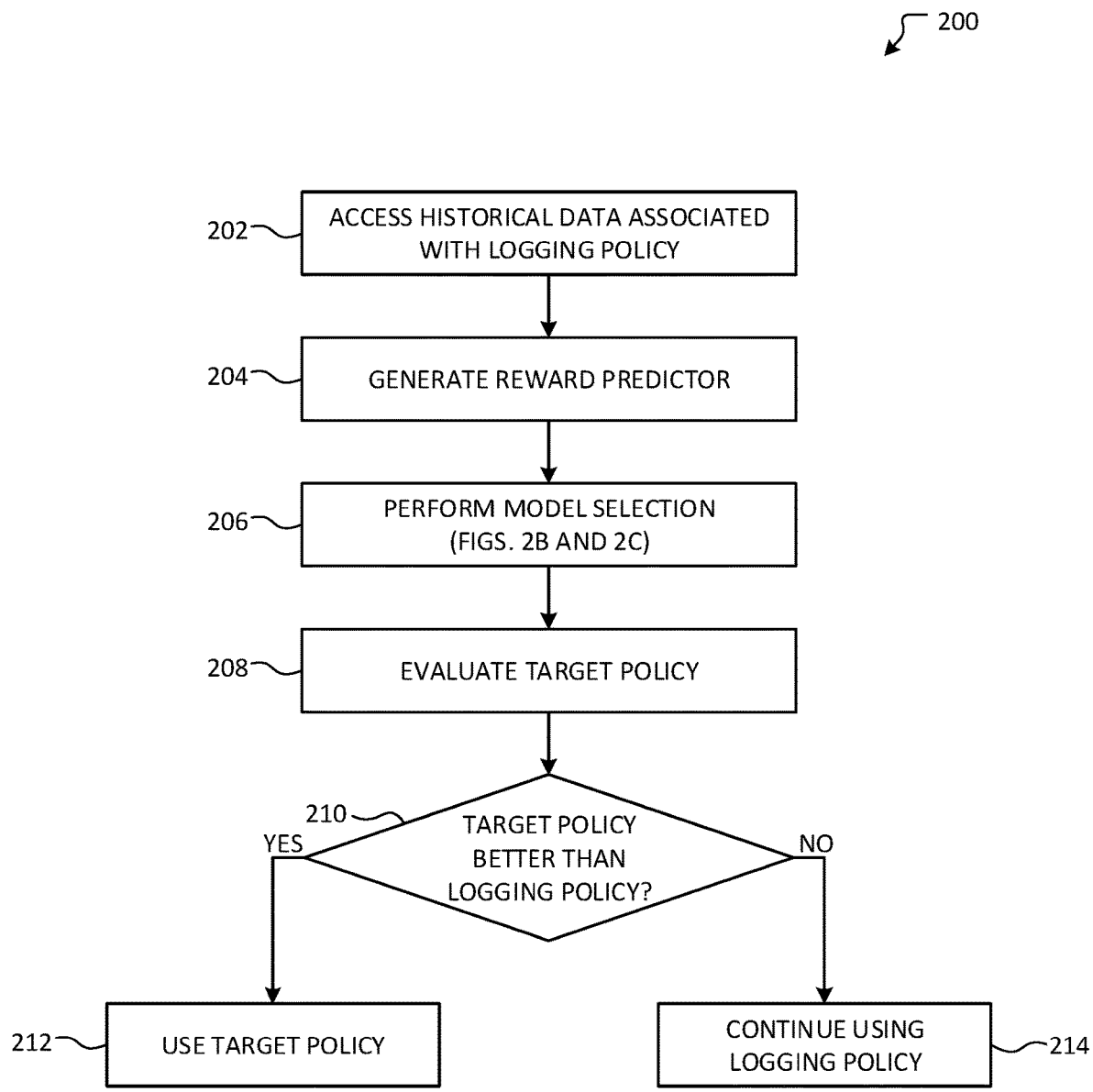
FIG. 2A illustrates an overview of an example method for evaluating a target policy based on historical data collected that was generated according to a logging policy.

FIG. 2A illustrates an overview of an example method 200 for evaluating a target policy based on historical data collected that was generated according to a logging policy. Method 200 may be may be performed by one or more computing devices, including, but not limited to, a personal computer, a laptop computer, a tablet computer, a mobile computing device, or a distributed computing device. As an example, aspects of method 200 may be performed by server device 102 and/or user device 104 in FIG. 1. As another example, aspects of method 200 may be performed by policy evaluation engine 112 in FIG. 1. Method 200 begins at operation 202, where historical data associated with a logging policy may be accessed. For example, the data may comprise information relating to a contextual bandit protocol, including a context, an action, a reward, and/or the performance of the protocol, according to aspects disclosed herein. It will be appreciated that data may be accessed from any of a variety of sources, including, but not limited to, a local data store (e.g., contextual data store 108 in FIG. 1) or a remote data store (e.g., historical data store 114), or any combination thereof.

At operation 204, a reward predictor is generated. As described above, a reward predictor may generate an expected reward. For example, the reward predictor generates an expected reward using the historical data associated with the logging policy, as was accessed at operation 202. Thus, in examples, the reward predictor generates the predicted reward given the context and the associated action that was determined by the logging policy based on the context. In some examples, the reward predictor may be modelled as a regression function (e.g., as may be the case when using a direct modeling approach).

It will be appreciated that, in other examples, multiple reward predictors may be generated at operation 204. For example, each reward predictor may use a different kind of regression function. As an example, a first reward predictor may be generated using linear regression, whereas a second reward predictor may be generated according to a deep neural network. Other examples include using different weighting techniques when generating the multiple reward predictors. Assuming a data weighting function $z(x,a)$, where $x$ is a context and $a$ is an action, example weighting techniques include, but are not limited to, a uniform weighting function (e.g., $z(x,a)=1$), a weighting function based on importance weights (e.g., assuming weights are defined by function $w(\,)$, $z(x,a)=w(x,a)$), or a weighting function based on the square of importance weights (e.g., $z(x,a)=w^2(x,a)$). Another example weighting function that may be used for policy optimization is:

$$z(x, a) = \frac{1}{mu(a \mid x)}$$

In the above example equation, mu( ) is a function describing the probability of picking action a given a context x while applying a given logging policy. It will be appreciated that the above equations are provided as examples and that any of a variety of other functions may be used according to aspects described herein.

At operation 206, the model selection process is performed using the generated reward predictor(s). As described herein, a set of one or more estimators may be used, such as a quality-agnostic estimator and/or a quality-based estimator. In some examples, multiple quality-agnostic estimators are evaluated at operation 206, where each quality-agnostic estimator uses a different hyperparameter. Similarly, multiple quality-based estimators may be evaluated at operation 206, where each quality-based estimator uses a different hyperparameter. Indeed, as discussed above, an estimator may include one or more hyperparameters that are used to clip or shrink the importance weights of the reward predictor according to aspects described herein. The model selection process further comprises evaluating each estimator to determine which estimator yields an off-policy evaluation model with the smallest error. As an example, the set of estimators may be compared according to the least squared error associated with each estimator. It will be appreciated that other techniques may be used to compare each of the models and ultimately select a model with which to evaluate the target policy As another example, models may be evaluated according to which models exhibit an error below a certain threshold or within a certain range. Additional example aspects of model selection are described in more detail below with respect to FIGS. 2B and 2C. In examples, the model selection may identify a policy that minimizes MSE, bias, and variance. The model selection may also identify which class of estimator to use.

Flow progresses to operation 208, where the target policy is evaluated according to the model selected at operation 206. In examples, the evaluation comprises using the selected model to generate an average reward metric for the target policy for a set of contexts from the historical data accessed at operation 202. It will be appreciated that any of a variety of other metrics may be used to evaluate a target policy, including, but not limited to, average variance or a total reward value.

At determination 210, it is determined whether the target policy is expected to perform better than the logging policy with which the historical data was generated. In examples, the determination comprises comparing the average reward metric for the target policy (e.g., that was generated at operation 208) as compared to the average reward incurred by the logging policy. If the target policy is better than the logging policy (e.g., it exhibits a higher average reward metric than the logging policy), flow branches YES to operation 212, where the target policy is used in place of the logging policy. For example, action generation engine 110 in FIG. 1 may receive an indication to use the target policy in place of the logging policy. Flow terminates at operation 212. If, however, it is determined that the target policy is not better than the logging policy, flow instead branches NO to operation 214, where the logging policy continues to be used instead of the target policy. Flow terminates at operation 214.

Figure 2B:
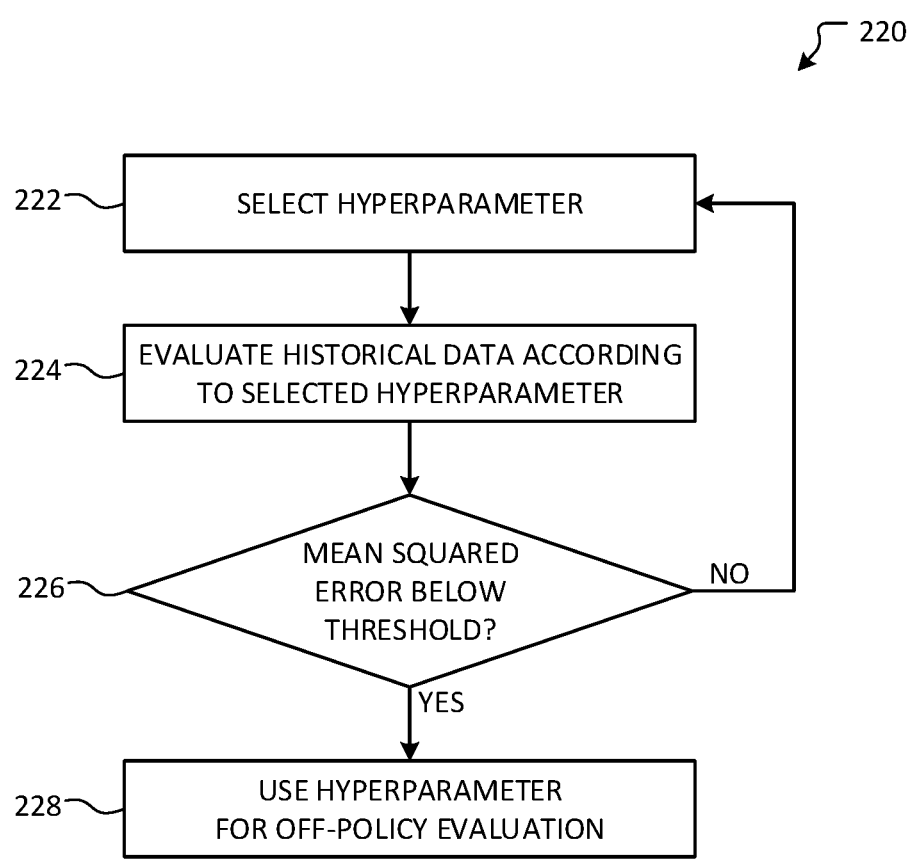
FIG. 2B illustrates an overview of an example method for determining a hyperparameter for off-policy evaluation.

FIG. 2B illustrates an overview of an example method 220 for determining a hyperparameter for off-policy evaluation. Method 220 may be may be performed by one or more computing devices, including, but not limited to, a personal computer, a laptop computer, a tablet computer, a mobile computing device, or a distributed computing device. As an example, aspects of method 220 may be performed by server device 102 and/or user device 104 in FIG. 1. As another example, aspects of method 220 may be performed by policy evaluation engine 112 in FIG. 1. Aspects of method 220 may be performed as part of the model selection process at operation 206 in FIG. 2A.

Method 220 begins at operation 222, where a hyperparameter is selected. In examples, the hyperparameter is selected according to one or more previous off-policy evaluations. In another example, the hyperparameter may be selected based on a hyperparameter that was used to evaluate a logging policy with which historical data was collected. In other examples, the hyperparameter may be iteratively selected, where the hyperparameter is either iteratively increased or decreased according to achieve an error below a threshold or within a certain range. It will be appreciated that a variety of other techniques may be used to select the hyperparameter.

At operation 224, historical data is evaluated according to a model based on the selected hyperparameter. In examples, the evaluation comprises using the hyperparameter with respect to one or more estimator classes, such as a quality-based estimator and/or a quality-agnostic estimator. The historical data may be accessed from a historical data store, such as historical data store 114 in FIG. 1. The evaluation may comprise generated an MSE for the model according to the hyperparameter. It will be appreciated that, in other examples, different metrics may be used to evaluate the model.

Flow progresses to determination 226, where it is determined whether the MSE is below a certain threshold. The threshold may be a threshold preconfigured by a user, or may be programmatically determined (e.g., based on evaluating the data according to a doubly robust estimator without application of either a quality-based or quality-agnostic estimator). It will be appreciated that, in other examples, a range of values may be used to determine whether the MSE is acceptable. If it is determined that the MSE is not below the threshold, flow branches NO and returns to operation 222. As noted above, the hyperparameter selection process may be iterative, such that an updated hyperparameter is determined at operation 222. Accordingly, flow loos between operations 222, 224, and 226 until the MSE is below a threshold. In some examples, determination 226 further comprises a counter such that flow instead branches YES to operation 228 after a certain number of iterations. Ultimately, flow arrives at operation 228, which is discussed below.

If, however, it is determined that the MSE is below the threshold, flow instead branches YES to operation 228, where the hyperparameter is used for off-policy evaluation according to aspects described herein. For example, performing the off-policy evaluation according to the determined hyperparameter may comprise performing the steps of method 200 in FIG. 2A, as described above. Flow terminates at operation 228.

Figure 2C:
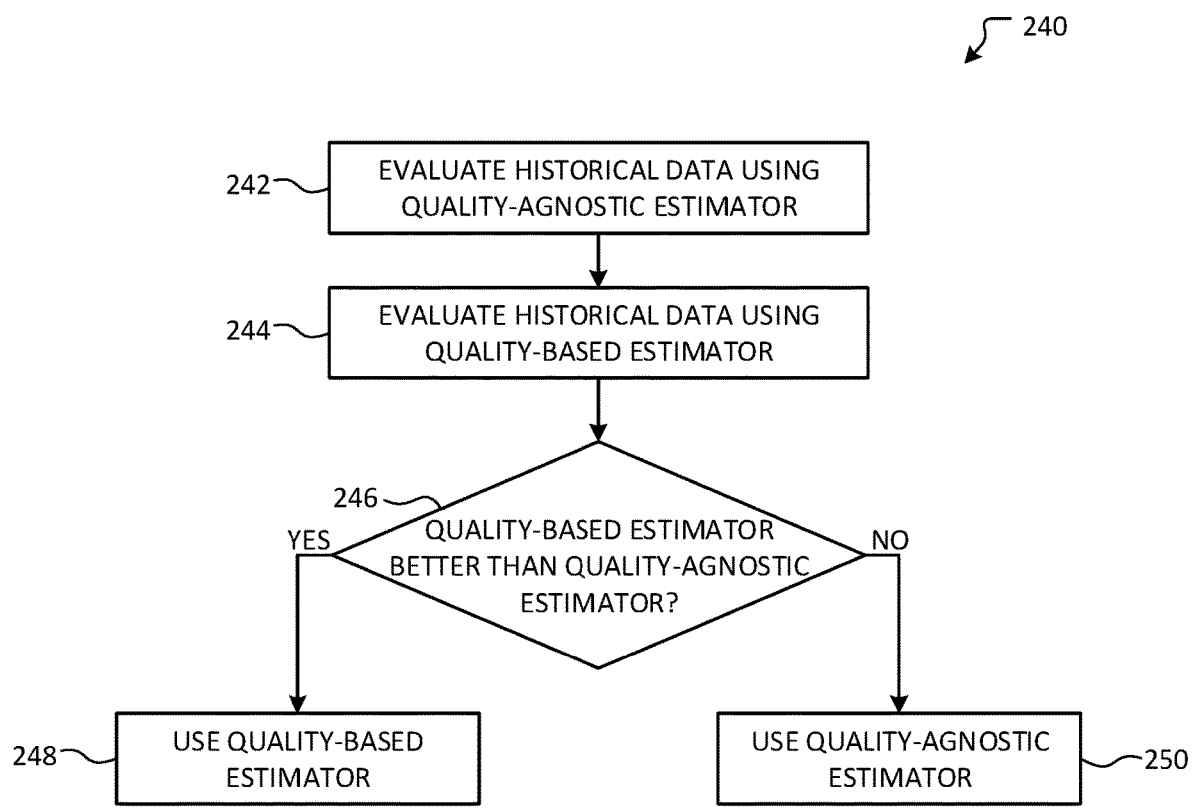
FIG. 2C illustrates an overview of an example method for selecting an estimator class for off-policy evaluation.

FIG. 2C illustrates an overview of an example method 240 for selecting an estimator class for off-policy evaluation. Method 240 may be may be performed by one or more computing devices, including, but not limited to, a personal computer, a laptop computer, a tablet computer, a mobile computing device, or a distributed computing device. As an example, aspects of method 240 may be performed by server device 102 and/or user device 104 in FIG. 1. As another example, aspects of method 240 may be performed by policy evaluation engine 112 in FIG. 1. Aspects of method 240 may be performed as part of the model selection process at operation 206 in FIG. 2A.

Method 240 begins at operation 242, where historical data is evaluated according to a quality-agnostic estimator. In examples, the quality-agnostic estimator clips weights that are placed on reward predictions according to aspects described herein. Operation 242 may comprise generating an MSE associated with the evaluation of the historical data using the quality-agnostic estimator.

Flow progresses to operation 244, where the historical data is evaluated according to a quality-based estimator. As discussed above, the quality-based estimator weights reward predictions according to the quality of the reward predictor. Similar to operation 242, operation 244 may further comprise generating an MSE for the evaluation of the historical data using the quality-based estimator. It will be appreciated that, in other examples, a different metric may be used, such that both operation 242 and operation 244 generate a different metric for comparison.

Moving to determination 246, it is determined whether the quality-based estimator yields better results than the quality-agnostic estimator. Method 240 is an example in which MSE is used to evaluate the two estimators. Accordingly, the determination comprises evaluating the MSE for each estimator to determine which estimator exhibits the lower MSE. If it is determined that the quality-based estimator yields a lower MSE, flow branches to operation 248, where the quality-based estimator is used to perform off-policy evaluation of a target policy (e.g., as discussed above with respect to method 200 in FIG. 2A). If, however, it is determined that the quality-agnostic estimator exhibits a lower MSE than the quality-based estimator, flow instead branches to operation 250, where the quality-agnostic estimator is used to perform off-policy evaluation of the target policy. Flow terminates at operation 248 or 250.

FIGS. 3-6 and the associated descriptions provide a discussion of a variety of operating environments in which aspects of the disclosure may be practiced. However, the devices and systems illustrated and discussed with respect to FIGS. 3-6 are for purposes of example and illustration and are not limiting of a vast number of computing device configurations that may be utilized for practicing aspects of the disclosure, described herein.

Figure 3:
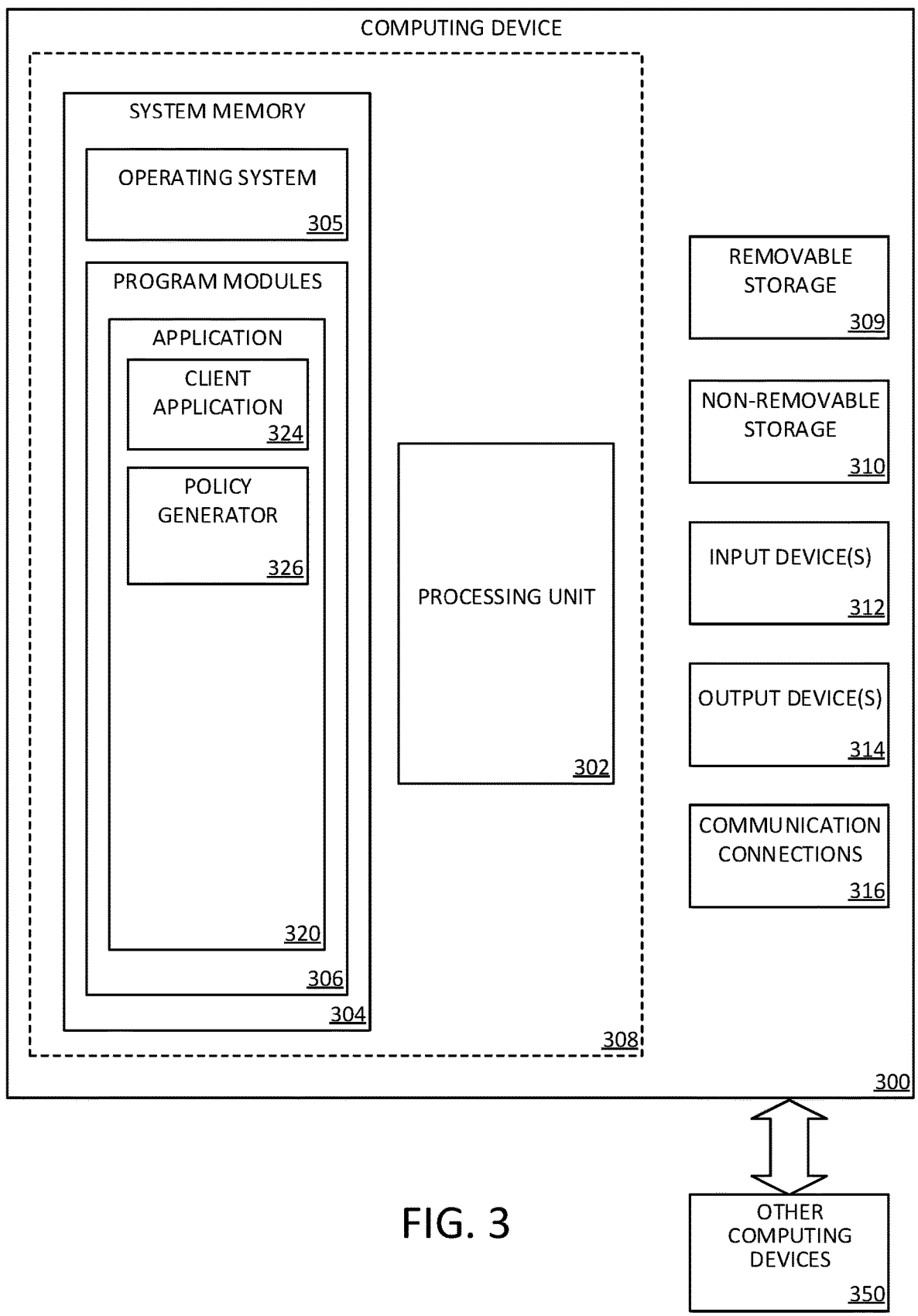
FIG. 3 is a block diagram illustrating example physical components of a computing device with which aspects of the disclosure may be practiced.

FIG. 3 is a block diagram illustrating physical components (e.g., hardware) of a computing device 300 with which aspects of the disclosure may be practiced. The computing device components described below may be suitable computing devices for implementing aspects of the present disclosure described above. In a basic configuration, the computing device 300 may include at least one processing unit 302 and a system memory 304. Depending on the configuration and type of computing device, the system memory 304 may comprise, but is not limited to, volatile storage (e.g., random access memory), non-volatile storage (e.g., read-only memory), flash memory, or any combination of such memories.

The system memory 304 may include an operating system 305 and one or more program modules 306 suitable for running software application 320, such as one or more components supported by the systems described herein. As examples, system memory 304 may store client application 324 and policy generator 326. For example, client application 324 may display content determined according to an action of a logging policy. A user may interact with such content, thereby incurring a reward. Such interactions may form a part of historical user interactions. Policy generator 326 may implement aspects of method 200 in order to optimize the logging model and/or generate a new target model according to aspects described herein. The operating system 305, for example, may be suitable for controlling the operation of the computing device 300.

Furthermore, embodiments of the disclosure may be practiced in conjunction with a graphics library, other operating systems, or any other application program and is not limited to any particular application or system. This basic configuration is illustrated in FIG. 3 by those components within a dashed line 308. The computing device 300 may have additional features or functionality. For example, the computing device 300 may also include additional data storage devices (removable and/or non-removable) such as, for example, magnetic disks, optical disks, or tape. Such additional storage is illustrated in FIG. 3 by a removable storage device 309 and a non-removable storage device 310.

As stated above, a number of program modules and data files may be stored in the system memory 304. While executing on the processing unit 302, the program modules 306 (e.g., application 320) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 3 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 300 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 300 may also have one or more input device(s) 312 such as a keyboard, a mouse, a pen, a sound or voice input device, a touch or swipe input device, etc. The output device(s) 314 such as a display, speakers, a printer, etc. may also be included. The aforementioned devices are examples and others may be used. The computing device 300 may include one or more communication connections 316 allowing communications with other computing devices 350. Examples of suitable communication connections 316 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 304, the removable storage device 309, and the non-removable storage device 310 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 300. Any such computer storage media may be part of the computing device 300. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 4A:
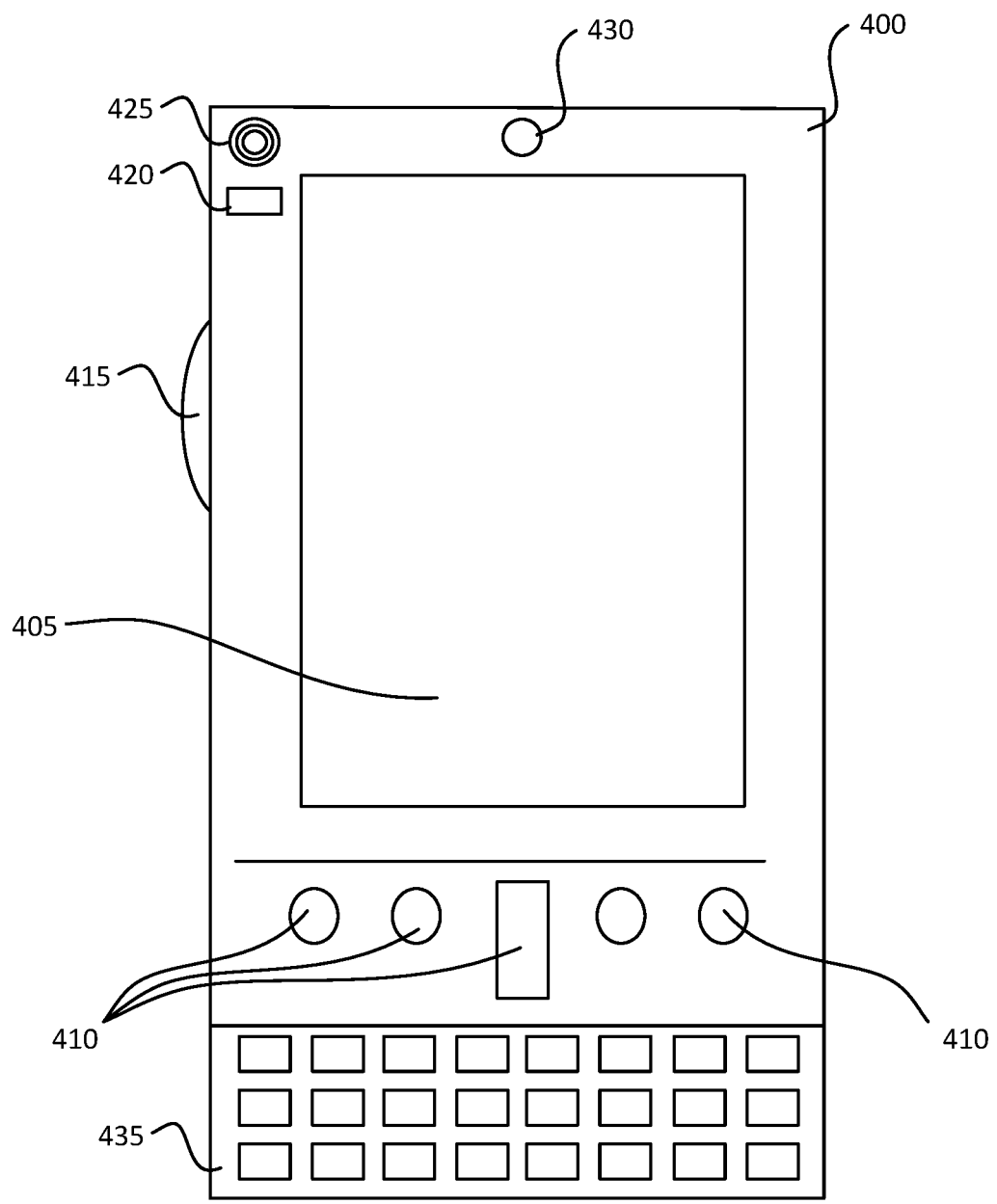
FIGS. 4A and 4B are simplified block diagrams of a mobile computing device with which aspects of the present disclosure may be practiced.
Figure 4B:
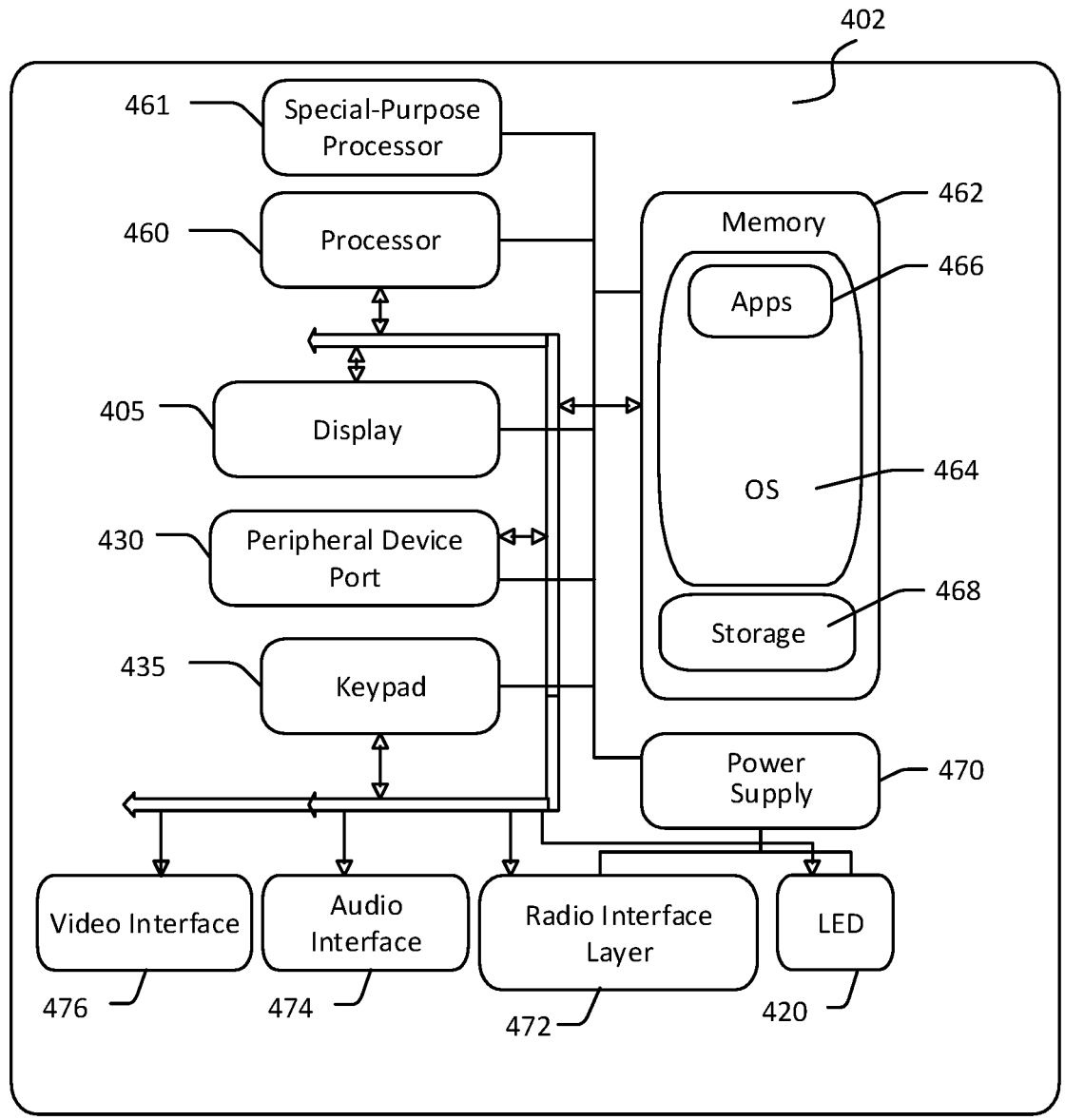

FIGS. 4A and 4B illustrate a mobile computing device 400, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 4A, one aspect of a mobile computing device 400 for implementing the aspects is illustrated. In a basic configuration, the mobile computing device 400 is a handheld computer having both input elements and output elements. The mobile computing device 400 typically includes a display 405 and one or more input buttons 410 that allow the user to enter information into the mobile computing device 400. The display 405 of the mobile computing device 400 may also function as an input device (e.g., a touch screen display).

If included, an optional side input element 415 allows further user input. The side input element 415 may be a rotary switch, a button, or any other type of manual input element. In alternative aspects, mobile computing device 400 may incorporate more or less input elements. For example, the display 405 may not be a touch screen in some embodiments.

In yet another alternative embodiment, the mobile computing device 400 is a portable phone system, such as a cellular phone. The mobile computing device 400 may also include an optional keypad 435. Optional keypad 435 may be a physical keypad or a "soft" keypad generated on the touch screen display.

In various embodiments, the output elements include the display 405 for showing a graphical user interface (GUI), a visual indicator 420 (e.g., a light emitting diode), and/or an audio transducer 425 (e.g., a speaker). In some aspects, the mobile computing device 400 incorporates a vibration transducer for providing the user with tactile feedback. In yet another aspect, the mobile computing device 400 incorporates input and/or output ports, such as an audio input (e.g., a microphone jack), an audio output (e.g., a headphone jack), and a video output (e.g., a HDMI port) for sending signals to or receiving signals from an external device.

FIG. 4B is a block diagram illustrating the architecture of one aspect of a mobile computing device. That is, the mobile computing device 400 can incorporate a system (e.g., an architecture) 402 to implement some aspects. In one embodiment, the system 402 is implemented as a "smart phone" capable of running one or more applications (e.g., browser, e-mail, calendaring, contact managers, messaging clients, games, and media clients/players). In some aspects, the system 402 is integrated as a computing device, such as an integrated personal digital assistant (PDA) and wireless phone.

One or more application programs 466 may be loaded into the memory 462 and run on or in association with the operating system 464. Examples of the application programs include phone dialer programs, e-mail programs, personal information management (PIM) programs, word processing programs, spreadsheet programs, Internet browser programs, messaging programs, and so forth. The system 402 also includes a non-volatile storage area 468 within the memory 462. The non-volatile storage area 468 may be used to store persistent information that should not be lost if the system 402 is powered down. The application programs 466 may use and store information in the non-volatile storage area 468, such as e-mail or other messages used by an e-mail application, and the like. A synchronization application (not shown) also resides on the system 402 and is programmed to interact with a corresponding synchronization application resident on a host computer to keep the information stored in the non-volatile storage area 468 synchronized with corresponding information stored at the host computer. As should be appreciated, other applications may be loaded into the memory 462 and run on the mobile computing device 400 described herein (e.g., search engine, extractor module, relevancy ranking module, answer scoring module, etc.).

The system 402 has a power supply 470, which may be implemented as one or more batteries. The power supply 470 might further include an external power source, such as an AC adapter or a powered docking cradle that supplements or recharges the batteries.

The system 402 may also include a radio interface layer 472 that performs the function of transmitting and receiving radio frequency communications. The radio interface layer 472 facilitates wireless connectivity between the system 402 and the "outside world," via a communications carrier or service provider. Transmissions to and from the radio interface layer 472 are conducted under control of the operating system 464. In other words, communications received by the radio interface layer 472 may be disseminated to the application programs 466 via the operating system 464, and vice versa.

The visual indicator 420 may be used to provide visual notifications, and/or an audio interface 474 may be used for producing audible notifications via the audio transducer 425. In the illustrated embodiment, the visual indicator 420 is a light emitting diode (LED) and the audio transducer 425 is a speaker. These devices may be directly coupled to the power supply 470 so that when activated, they remain on for a duration dictated by the notification mechanism even though the processor 460 and other components might shut down for conserving battery power. The LED may be programmed to remain on indefinitely until the user takes action to indicate the powered-on status of the device. The audio interface 474 is used to provide audible signals to and receive audible signals from the user. For example, in addition to being coupled to the audio transducer 425, the audio interface 474 may also be coupled to a microphone to receive audible input, such as to facilitate a telephone conversation. In accordance with embodiments of the present disclosure, the microphone may also serve as an audio sensor to facilitate control of notifications, as will be described below. The system 402 may further include a video interface 476 that enables an operation of an on-board camera 430 to record still images, video stream, and the like.

A mobile computing device 400 implementing the system 402 may have additional features or functionality. For example, the mobile computing device 400 may also include additional data storage devices (removable and/or non-removable) such as, magnetic disks, optical disks, or tape.

Such additional storage is illustrated in FIG. 4B by the non-volatile storage area 468.

Data/information generated or captured by the mobile computing device 400 and stored via the system 402 may be stored locally on the mobile computing device 400, as described above, or the data may be stored on any number of storage media that may be accessed by the device via the radio interface layer 472 or via a wired connection between the mobile computing device 400 and a separate computing device associated with the mobile computing device 400, for example, a server computer in a distributed computing network, such as the Internet. As should be appreciated such data/information may be accessed via the mobile computing device 400 via the radio interface layer 472 or via a distributed computing network. Similarly, such data/information may be readily transferred between computing devices for storage and use according to well-known data/information transfer and storage means, including electronic mail and collaborative data/information sharing systems.

Figure 5:
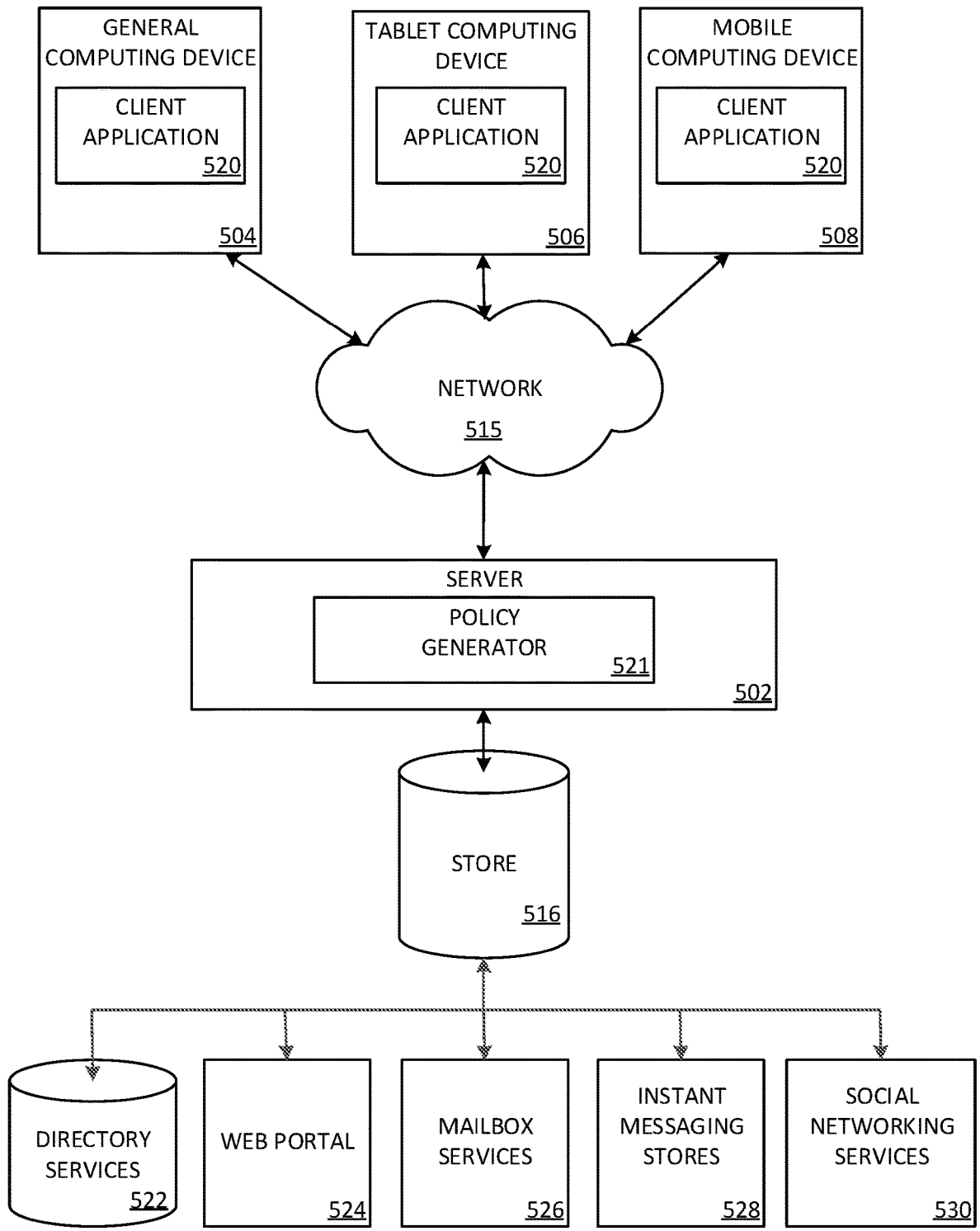
FIG. 5 is a simplified block diagram of a distributed computing system in which aspects of the present disclosure may be practiced.

FIG. 5 illustrates one aspect of the architecture of a system for processing data received at a computing system from a remote source, such as a personal computer 504, tablet computing device 506, or mobile computing device 508, as described above. Content displayed at server device 502 may be stored in different communication channels or other storage types. For example, various documents may be stored using a directory service 522, a web portal 524, a mailbox service 526, an instant messaging store 528, or a social networking site 530.

A client application 520 may be employed by a client that communicates with server device 502, and/or the policy generator 521 may be employed by server device 502. The server device 502 may provide data to and from a client computing device such as a personal computer 504, a tablet computing device 506 and/or a mobile computing device 508 (e.g., a smart phone) through a network 515. By way of example, the computer system described above may be embodied in a personal computer 504, a tablet computing device 506 and/or a mobile computing device 508 (e.g., a smart phone). Any of these embodiments of the computing devices may obtain content from the store 516, in addition to receiving graphical data useable to be either pre-processed at a graphic-originating system, or post-processed at a receiving computing system.

Figure 6:
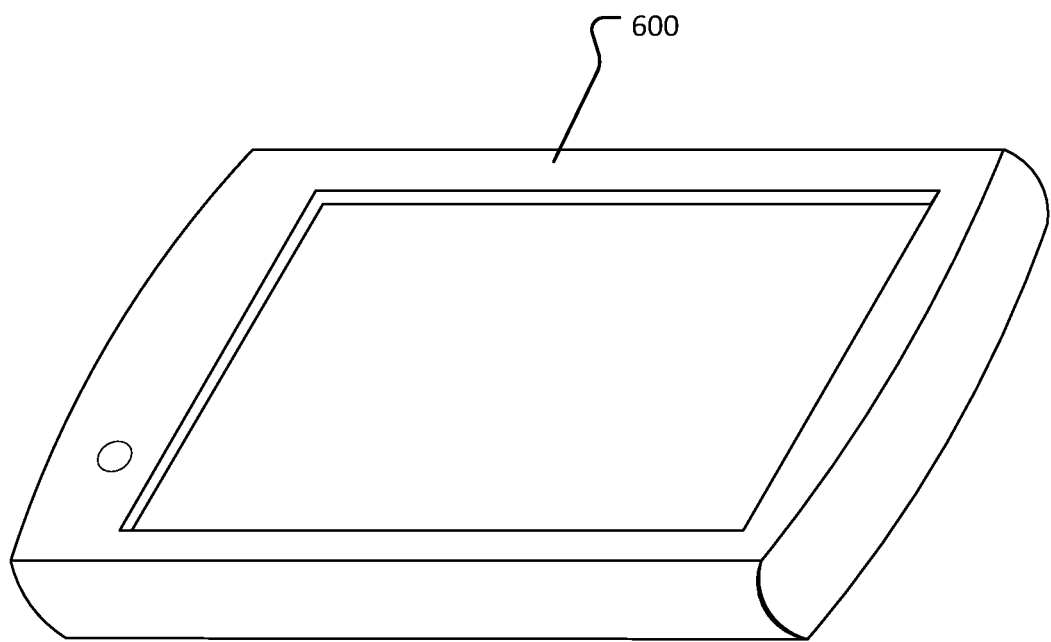
FIG. 6 illustrates a tablet computing device for executing one or more aspects of the present disclosure.

FIG. 6 illustrates an exemplary tablet computing device 600 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As will be understood from the foregoing disclosure, one aspect of the technology relates to a system comprising at least one processor; and memory storing instructions that, when executed by the at least one processor, causes the system to perform a set of operations. The set of operations comprises: generating a reward predictor for historical data associated with a logging policy; determining an off-policy evaluation model, wherein the off-policy evaluation model comprises an estimator selected from the group consisting of a quality-agnostic estimator and a quality-based estimator; evaluating, using the off-policy evaluation model, a target policy to determine whether an expected reward metric of the target policy is higher than a reward metric of the logging policy; and when it is determined that the expected reward metric is higher than the reward metric of the logging policy, generating an indication to use the target policy instead of the logging policy. In an example, determining the off-policy evaluation model comprises: generating, for the quality-agnostic estimator, a first mean squared error (MSE) metric; generating, for the quality-based estimator, a second MSE metric; when the first MSE is lower than the second MSE, selecting the quality-agnostic estimator as the estimator; and when the second MSE is lower than the first MSE, selecting the quality-based estimator as the estimator. In another example, off-policy evaluation model comprises a combination of direct modeling of a reward predictor and inverse propensity scoring, and a weight of the reward predictor in the off-policy evaluation model is determined according to the estimator. In a further example, determining the off-policy evaluation model comprises determining a hyperparameter for the estimator. In yet another example, the set of operations further comprises: receiving, from a user device, a second indication of a context; determining, according to the target policy, an action based on the received context; and providing, in response to the first indication, a third indication of the determined action. In a further still example, the quality-agnostic estimator comprises a threshold at which an importance weight is clipped if the weight exceeds the threshold. In an example, the set of operations further comprises: accessing the historical data from a historical data store, wherein the historical data comprises at least one context, an action associated with the context, and a reward for the action.

In another aspect, the technology relates to a method for selecting a new policy based on a previous policy. The method comprises: accessing historical data associated with the previous policy, the historical data comprising at least one context, an action determined based on the context, and a reward for the action; evaluating, using an off-policy evaluation model, the new policy to determine whether to use the new policy instead of the previous policy, wherein the off-policy evaluation model comprises a combination of a direct model, inverse propensity scoring, and an estimator selected from the group consisting of a quality-agnostic estimator and a quality-based estimator; and based on determining that the new policy should be used instead of the previous policy: generating an action for a context according to the new policy; and providing an indication of the action to a user device. In an example, the new policy is determined to be used instead of the old policy when an average reward metric for the new policy is higher than an average reward metric for previous policy, and the average reward metric for the new policy is determined using the off-policy evaluation model. In another example, the estimator of the off-policy evaluation model is selected by: generating, for the quality-agnostic estimator, a first mean squared error (MSE) metric; generating, for the quality-based estimator, a second MSE metric; when the first MSE is lower than the second MSE, selecting the quality-agnostic estimator as the estimator; and when the second MSE is lower than the first MSE, selecting the quality-based estimator as the estimator. In a further example, the method further comprises: determining, for the selected estimator, a hyperparameter for the estimator, wherein the hyperparameter is determined by iteratively refining the hyperparameter to reduce the MSE of the selected estimator. In yet another example, the quality-agnostic estimator comprises a threshold at which an importance weight is clipped if the weight exceeds the threshold. In a further still example, the direct model is a regression model for the historical data, and wherein the inverse propensity scoring generates a weight for a predicted reward.

In another aspect, the technology relates to another method for off-policy evaluation of a target policy. The method comprises: generating a reward predictor for historical data associated with a logging policy; determining an off-policy evaluation model, wherein the off-policy evaluation model comprises an estimator selected from the group consisting of a quality-agnostic estimator and a quality-based estimator; evaluating, using the off-policy evaluation model, the target policy to determine whether an expected reward metric of the target policy is higher than a reward metric of the logging policy; and when it is determined that the expected reward metric is higher than the reward metric of the logging policy, generating an indication to use the target policy instead of the logging policy. In an example, determining the off-policy evaluation model comprises: generating, for the quality-agnostic estimator, a first mean squared error (MSE) metric; generating, for the quality-based estimator, a second MSE metric; when the first MSE is lower than the second MSE, selecting the quality-agnostic estimator as the estimator; and when the second MSE is lower than the first MSE, selecting the quality-based estimator as the estimator. In another example, off-policy evaluation model comprises a combination of direct modeling of a reward predictor and inverse propensity scoring, and a weight of the reward predictor in the off-policy evaluation model is determined according to the estimator. In a further example, determining the off-policy evaluation model comprises generating a hyperparameter for the estimator. In yet another example, the method further comprises: receiving, from a user device, a second indication of a context; determining, according to the target policy, an action based on the received context; and providing, in response to the first indication, a third indication of the determined action. In a further still example, the quality-agnostic estimator comprises a threshold at which an importance weight is clipped if the weight exceeds the threshold. In an example, the method further comprises: accessing the historical data from a historical data store, wherein the historical data comprises at least one context, an action associated with the context, and a reward for the action.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   at least one processor; and
   memory storing instructions that, when executed by the at least one processor, causes the system to perform a set of operations, the set of operations comprising:
      generating a reward predictor for historical data associated with a logging policy, wherein the reward predictor is usable to generate an expected reward based on the historical data;
      determining an off-policy evaluation model, wherein the off-policy evaluation model comprises an estimator selected from the group of estimators consisting of a quality-agnostic estimator and a quality-based estimator;
      evaluating, using the off-policy evaluation model and based on the historical data associated with the logging policy, a target policy to determine whether an expected reward metric of the target policy is higher than a reward metric of the logging policy; and
      when it is determined that the expected reward metric is higher than the reward metric of the logging policy, generating an indication to use the target policy instead of the logging policy, wherein:
      a first reward is generated based on user completion of a first action and a second reward is generated based on user completion of a second action; and
      the reward predictor is trained to generate the expected reward for a given context.

2. The system of claim 1, wherein determining the off-policy evaluation model comprises:
   generating, for the quality-agnostic estimator, a first mean squared error (MSE) metric;
   generating, for the quality-based estimator, a second MSE metric;
   when the first MSE is lower than the second MSE, selecting the quality-agnostic estimator as the estimator; and
   when the second MSE is lower than the first MSE, selecting the quality-based estimator as the estimator.

3. The system of claim 1, wherein:
   the off-policy evaluation model comprises a combination of direct modeling of a reward predictor and inverse propensity scoring; and
   a weight of the reward predictor in the off-policy evaluation model is determined according to the estimator.

4. The system of claim 1, wherein determining the off-policy evaluation model comprises determining a hyperparameter for the estimator.

5. The system of claim 1, wherein the set of operations further comprises:
receiving, from a user device, a second indication of a context;
determining, according to the target policy, an action based on the received context; and
providing, in response to the second indication, a third indication of the determined action.

6. The system of claim 1, wherein the quality-agnostic estimator comprises a threshold at which an importance weight is clipped if the weight exceeds the threshold.

7. The system of claim 1, wherein the set of operations further comprises:
accessing the historical data from a historical data store, wherein the historical data comprises a context, an action associated with the context, and a reward for the action.

8. A method for off-policy evaluation of a target policy, the method comprising:
generating a reward predictor for historical data associated with a logging policy, wherein the reward predictor is usable to generate an expected reward based on the historical data;
determining an off-policy evaluation model, wherein the off-policy evaluation model comprises an estimator selected from the group of estimators consisting of a quality-agnostic estimator and a quality-based estimator;
evaluating, using the off-policy evaluation model and based on the historical data associated with the logging policy, the target policy to determine whether an expected reward metric of the target policy is higher than a reward metric of the logging policy; and
when it is determined that the expected reward metric is higher than the reward metric of the logging policy, generating an indication to use the target policy instead of the logging policy, wherein
a first reward is generated based on user completion of a first action and a second reward is generated based on user completion of a second action; and
the reward predictor is trained to generate the expected reward for a given context.

9. The method of claim 8, wherein determining the off-policy evaluation model comprises:
generating, for the quality-agnostic estimator, a first mean squared error (MSE) metric;
generating, for the quality-based estimator, a second MSE metric;
when the first MSE is lower than the second MSE, selecting the quality-agnostic estimator as the estimator; and
when the second MSE is lower than the first MSE, selecting the quality-based estimator as the estimator.

10. The method of claim 8, wherein:
the off-policy evaluation model comprises a combination of direct modeling of a reward predictor and inverse propensity scoring; and
a weight of the reward predictor in the off-policy evaluation model is determined according to the estimator.

11. The method of claim 8, wherein determining the off-policy evaluation model comprises generating a hyperparameter for the estimator.

12. The method of claim 8, further comprising:
receiving, from a user device, a second indication of a context;
determining, according to the target policy, an action based on the received context; and
providing, in response to the second indication, a third indication of the determined action.

13. The method of claim 8, wherein the quality-agnostic estimator comprises a threshold at which an importance weight is clipped if the weight exceeds the threshold.

14. The method of claim 8, further comprising:
accessing the historical data from a historical data store, wherein the historical data comprises a context, an action associated with the context, and a reward for the action.

* * * * *